United States Patent
Matsumoto et al.

(10) Patent No.: US 12,206,254 B2
(45) Date of Patent: *Jan. 21, 2025

(54) POWER TRANSMISSION DEVICE AND WIRELESS POWER TRANSMISSION SYSTEM

(71) Applicant: PANASONIC HOLDINGS CORPORATION, Osaka (JP)

(72) Inventors: Hiromu Matsumoto, Gifu (JP); Hiroshi Kanno, Osaka (JP); Atsushi Yamamoto, Kyoto (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,034

(22) Filed: Mar. 5, 2024

(65) Prior Publication Data
US 2024/0213806 A1 Jun. 27, 2024

Related U.S. Application Data

(63) Continuation of application No. 17/333,150, filed on May 28, 2021, now Pat. No. 11,962,163, which is a
(Continued)

(30) Foreign Application Priority Data

Aug. 5, 2014 (JP) .................................. 2014-159429

(51) Int. Cl.
*H02J 50/60* (2016.01)
*H01F 38/14* (2006.01)
(Continued)

(52) U.S. Cl.
CPC .............. *H02J 50/12* (2016.02); *H01F 38/14* (2013.01); *H02J 5/00* (2013.01); *H02J 7/0042* (2013.01);
(Continued)

(58) Field of Classification Search
CPC .. H02J 50/12; H02J 5/00; H02J 7/0042; H02J 7/0044; H02J 50/10; H02J 50/60;
(Continued)

(56) References Cited

U.S. PATENT DOCUMENTS

2010/0259217 A1 10/2010 Baarman et al.
2011/0046438 A1 2/2011 Iwaisako
(Continued)

FOREIGN PATENT DOCUMENTS

JP 2012-504844 2/2012
JP 2012-161110 8/2012
(Continued)

OTHER PUBLICATIONS

The Extended European Search Report dated Dec. 7, 2015 for European Patent Application No. 15176947.8.

*Primary Examiner* — Elim Ortiz
(74) *Attorney, Agent, or Firm* — Greenblum & Bernstein, P.L.C.

(57) ABSTRACT

A power transmission device includes power transmission coils arranged in a line, a power transmission circuit connected to the power transmission coils, and control circuitry that switches an electrical connection between the power transmission circuit and each power transmission coil, detects a relative position between the power receiving coil and each power transmission coil, selects two or more power transmission coils adjacent to each other based on the detected relative position, and causes the power transmission circuit to supply the AC power to the selected two or more power transmission coils. In a direction perpendicular to an array direction of the power transmission coils, width Dlt of each power transmission coil is equal to or longer than width Dlr of the power receiving coil. In the array direction, width Dwt of each power transmission coil is shorter than
(Continued)

width Dwr of the power receiving coil and satisfies $0.2 \leq Dwt/Dwr$.

1 Claim, 16 Drawing Sheets

Related U.S. Application Data continuation of application No. 15/956,204, filed on Apr. 18, 2018, now Pat. No. 11,056,919, which is a continuation of application No. 14/805,058, filed on Jul. 21, 2015, now Pat. No. 9,979,235.

(51) Int. Cl.
| | | |
|---|---|---|
| *H02J 5/00* | (2016.01) | |
| *H02J 7/00* | (2006.01) | |
| *H02J 50/10* | (2016.01) | |
| *H02J 50/12* | (2016.01) | |
| *H02J 50/70* | (2016.01) | |
| *H02J 50/80* | (2016.01) | |
| *H02J 50/90* | (2016.01) | |

(52) U.S. Cl.
CPC .............. *H02J 7/0044* (2013.01); *H02J 50/10* (2016.02); *H02J 50/60* (2016.02); *H02J 50/70* (2016.02); *H02J 50/80* (2016.02); *H02J 50/90* (2016.02)

(58) Field of Classification Search
CPC . H02J 50/70; H02J 50/80; H02J 50/90; H01F 38/14
USPC .......... 307/9.1, 104; 320/108, 109, 137, 115
See application file for complete search history.

(56) References Cited

U.S. PATENT DOCUMENTS

| | | | |
|---|---|---|---|
| 2011/0186905 A1 | 8/2011 | Schwab et al. | |
| 2012/0256585 A1 | 10/2012 | Partovi et al. | |
| 2013/0043836 A1* | 2/2013 | Hui | H01F 27/361 320/108 |
| 2013/0069586 A1* | 3/2013 | Jung | H02J 50/12 320/108 |
| 2013/0175877 A1* | 7/2013 | Abe | H02J 50/12 307/104 |
| 2014/0306655 A1* | 10/2014 | Sadakata | B60L 53/122 320/108 |
| 2016/0013658 A1* | 1/2016 | Kohara | H02J 50/12 307/104 |

FOREIGN PATENT DOCUMENTS

| | | |
|---|---|---|
| JP | 2012-523814 | 10/2012 |
| JP | 2013-046439 | 3/2013 |
| JP | 2013-070606 | 4/2013 |
| WO | 2013/099221 | 7/2013 |
| WO | 2014/070026 | 5/2014 |

* cited by examiner

POWER TRANSMISSION DEVICE AND WIRELESS POWER TRANSMISSION SYSTEM

CROSS REFERENCE TO RELATED APPLICATION

This is a Continuation of U.S. patent application Ser. No. 17/333,150, filed May 28, 2021, which is a Continuation of U.S. patent application Ser. No. 15/956,204, filed Apr. 18, 2018, now U.S. Pat. No. 11,056,919, issued Jul. 6, 2021, which is a Continuation of U.S. patent application Ser. No. 14/805,058, filed Jul. 21, 2015, now U.S. Pat. No. 9,979,235, issued May 22, 2018, which claims priority to Japanese Patent Application No. 2014-159429, filed Aug. 5, 2014. The entire disclosure of each of the above-identified documents is incorporated herein by reference in its entirety.

BACKGROUND

1. Technical Field

The present disclosure relates to a power transmission device and a wireless power transmission system which are used for wireless power transmission by which non-contact transmission of power is performed.

2. Description of the Related Art

In recent years, movable devices which can be charged, such as portable information terminals and electric vehicles, have become widespread. A wireless power transmission system for such devices is being developed. As the wireless power transmission technology, schemes such as an electromagnetic induction scheme, a magnetic field resonance scheme (a resonance magnetic field coupling scheme), and an electric field coupling scheme are known.

The wireless power transmission system of the electromagnetic induction scheme and the wireless power transmission system of the magnetic field resonance scheme include a power transmission device provided with a power transmission coil and a power receiving device provided with a power receiving coil. The power receiving coil complements the magnetic field generated by the power transmission coil, whereby it is possible to transmit power without bringing electrodes into direct contact with each other.

One of the requirements which are required in wireless power transmission is to make it unnecessary to perform positioning between the power transmission device and the power receiving device. That is, the requirement is that it is possible to perform high-efficiency power transmission without adjusting the position and orientation of the power receiving device to particular position and orientation. For example, as depicted in FIGS. 1A and 1B, even when the relative position of a power receiving device 200 with respect to a power transmission device 100 varies, the power transmission efficiency which is maintained so as to be roughly constant is required. One of the technologies that eliminate such positioning is a method called a coil array type.

In the coil array type, a power transmission device has a coil array formed of power transmission coils, and a power transmission coil to which power is applied is selected according the position of a power receiving coil. As a result, irrespective of the position of the power receiving coil, it is possible to perform high-efficiency power transmission. A wireless power transmission system of such a coil array type is disclosed in, for example, Japanese Unexamined Patent Application Publication No. 2012-504844, U.S. Pat. Nos. 8,519,668, and 8,629,654.

SUMMARY

However, in such conventional technologies, a power transmission device of a wireless power transmission system of the coil array type that can achieve a reduction in the thickness or size thereof has been required.

In one general aspect, the techniques disclosed here feature a power transmission device comprising:
  power transmission coils arranged in a line such that each principal surface of the power transmission coils is in parallel to a surface of the power transmission device, the power transmission coils transmitting AC power wirelessly to a power receiving coil of a power receiving device;
    a power transmission circuit that is connected to the power transmission coils and supplies the AC power to the power transmission coils; and
    control circuitry operative to:
    switch an electrical connection state between the power transmission circuit and each of the power transmission coils,
    detect a relative position between the power receiving coil and each of the power transmission coils,
    select the power transmission coils adjacent to each other from the transmission coils based on the detected relative position, thereby fixing a number of the selected power transmission coils, and
    cause the power transmission circuit to supply the AC power to the selected power transmission coils,
    wherein in an array direction of the power transmission coils, a length Dwt of each of the power transmission coils is shorter than a maximum diameter Dwr of the power receiving coil.

It should be noted that general or specific embodiments may be implemented as a system, a device, a method, an integrated circuit, a computer program, a storage medium, or any selective combination thereof.

According to an aspect of the present disclosure, it is possible to implement a reduction in the thickness or size of the power transmission device of the wireless power transmission system.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

It has been found out that it is difficult to achieve a reduction in the thickness or size of the power transmission devices of the conventional wireless power transmission systems of the coil array type described in, for example, Japanese Unexamined Patent Application Publication No. 2012-504844, U.S. Pat. Nos. 8,519,668, and 8,629,654.

The detailed explanation will be given below.

Figure 1A:
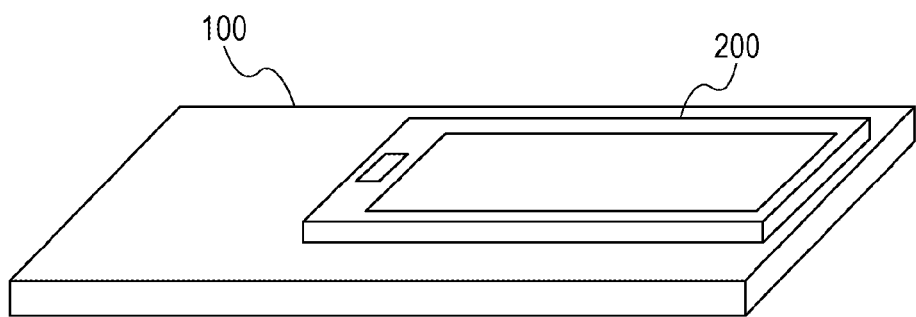
FIGS. 1A and 1B are diagrams depicting two examples of the position of a power receiving device with respect to a power transmission device, the position in one example is different from that in the other example.
Figure 1B:
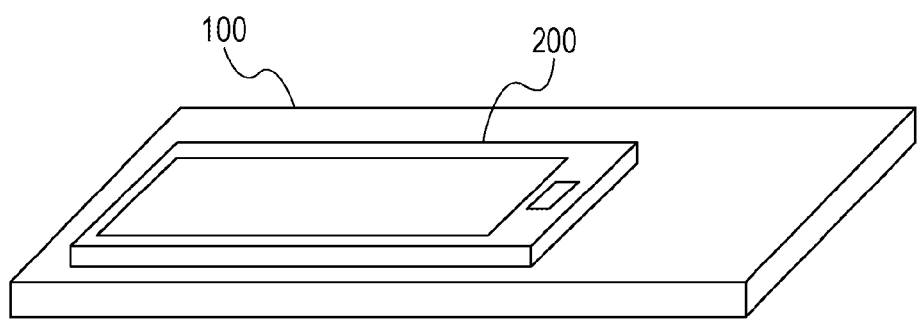
Figure 2A:
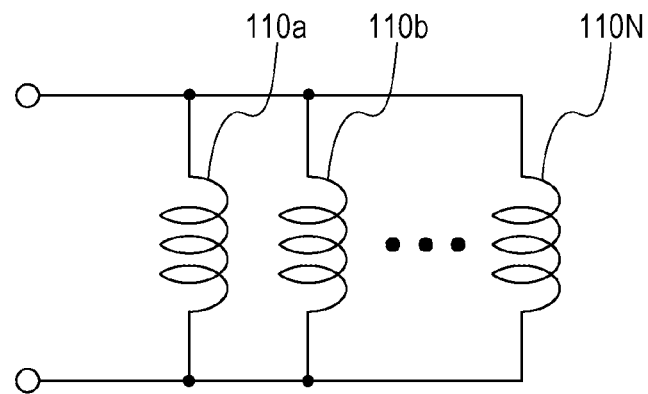
FIGS. 2A and 2B are diagrams depicting a plurality of power transmission coils which are connected in parallel.

As depicted in FIG. 2A, in an conventional power transmission device of the coil array type, when N (N is an integer greater than or equal to 2) coils $110a$ to $110N$ are connected in parallel and operated, the inductance of all the coils becomes 1/N times the inductance of each coil.

It has been found out that, for this reason, there is a need to increase the number of turns or the number of stacked layers in order to increase the inductance of each coil by N times, which makes it difficult to achieve a reduction in the thickness or size of the power transmission device.

Figure 2B:
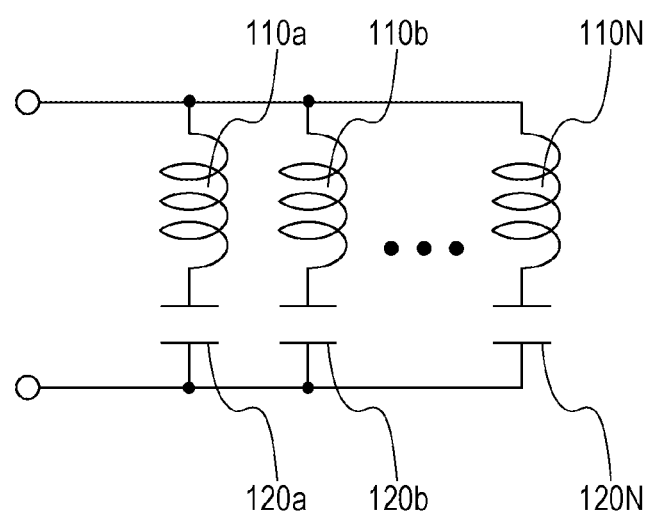

Moreover, it has been found out that, in a configuration in which N sets of a coil and a capacitor ($120a$ to $120N$) are connected in parallel as depicted in FIG. 2B, it is necessary to provide a large number of capacitors, which makes it difficult to achieve a reduction in the thickness or size of the power transmission device.

Therefore, a reduction in the thickness or size of the power transmission device is needed.

From the above consideration, the inventors have conceived of the aspects of the present disclosure which will be described below.

A power transmission device according to an aspect of the present disclosure is a power transmission device comprising:

power transmission coils arranged in a line such that each principal surface of the power transmission coils is in parallel to a surface of the power transmission device, the power transmission coils transmitting AC power wirelessly to a power receiving coil of a power receiving device;

a power transmission circuit that is connected to the power transmission coils and supplies the AC power to the power transmission coils; and control circuitry operative to:

switch an electrical connection state between the power transmission circuit and each of the power transmission coils, detect a relative position between the power receiving coil and each of the power transmission coils, select the power transmission coils adjacent to each other from the transmission coils based on the detected relative position, thereby fixing a number of the selected power transmission coils, and cause the power transmission circuit to supply the AC power to the selected power transmission coils, wherein in an array direction of the power transmission coils, a length Dwt of each of the power transmission coils is shorter than a maximum diameter Dwr of the power receiving coil.

Figure 3A:
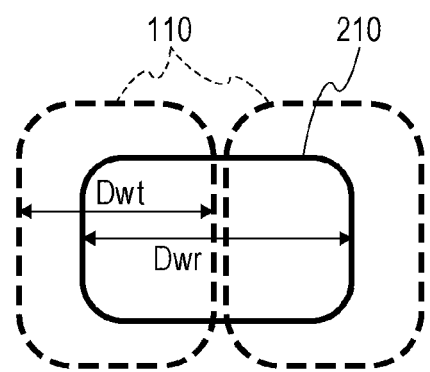
FIGS. 3A and 3B are diagrams depicting two examples of the placement of a power receiving coil, the placement in one example is different from that in the other example.
Figure 3B:
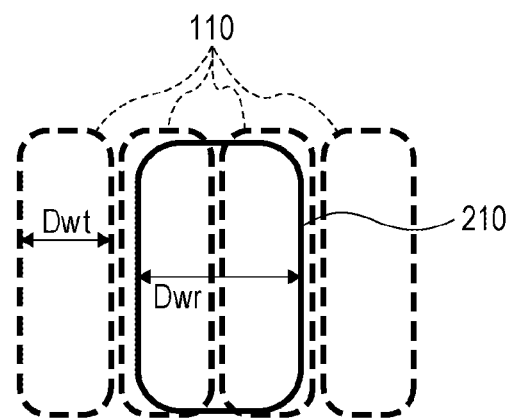

According to the above-described aspect, the power transmission device is configured so as to include a plurality of power transmission coils arranged in a line in a plane and supply power only to a specific number of power transmission coils of the plurality of power transmission coils. Moreover, the size of each coil is set such that, when the power receiving coil faces at least some of the plurality of power transmission coils for power transmission, the length of each power transmission coil in the array direction of the plurality of power transmission coils is shorter than the length of the power receiving coil in the same direction. On the other hand, the length of each power transmission coil in a direction perpendicular to the array direction in the above-described plane is set so as to be longer than the length of the power receiving coil in the same direction. For example, as depicted in FIGS. 3A and 3B, the length Dwr of a power receiving coil 210 in the array direction of a plurality of power transmission coils 110 varies depending on the relative placement of the plurality of power transmission coils 110 and the power receiving coil 210. The width Dwt of each power transmission coil in the array direction is set so as to be smaller than the width Dwr of the power receiving coil 210 determined by the orientation of the power receiving coil 210 which is assumed at the time of power transmission. If the length Dwr of the power receiving coil 210 in the array direction of the plurality of power transmission coils 110 is 24 mm, for example, the length of each power transmission coil in the array direction is set so as to be shorter than 24 mm and the length of each power transmission coil in the direction perpendicular to the array direction is set so as to be longer than 24 mm.

Figure 4A:
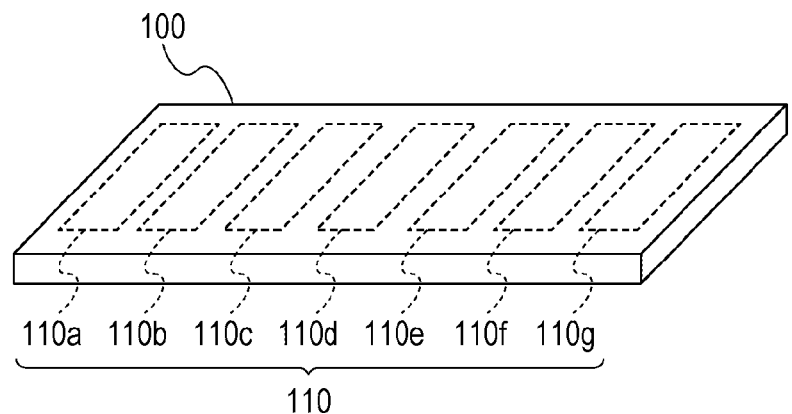
FIGS. 4A to 4C are perspective views depicting the positional relationship between a power transmission device and a power receiving device in an embodiment of the present disclosure.
Figure 4B:
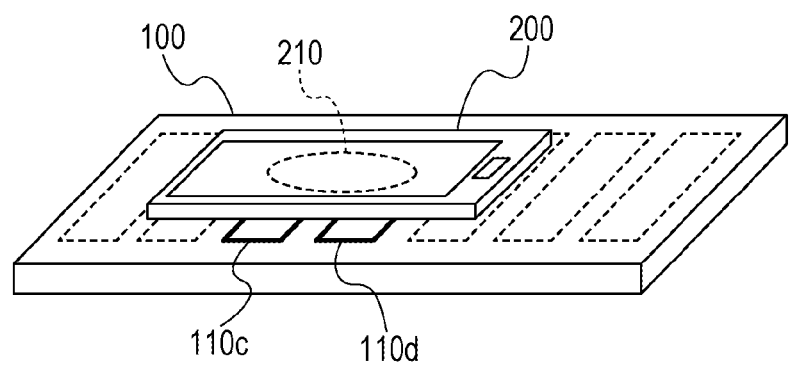
Figure 4C:
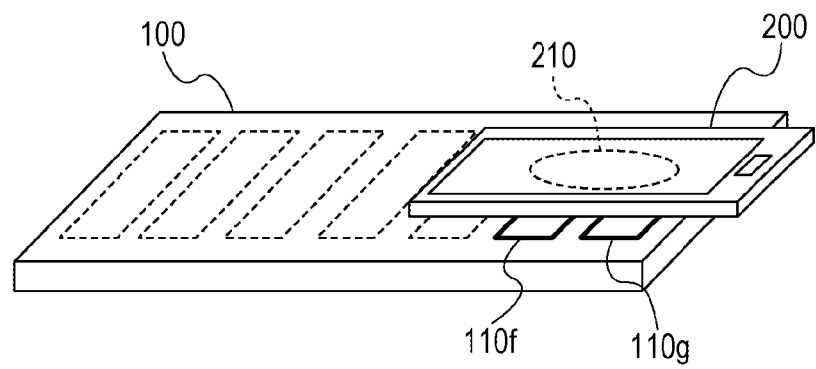

FIGS. 4A to 4C are diagrams depicting the appearance and operation of a power transmission device 100 in an embodiment. This power transmission device 100 is a wireless charger and has a flat plate-like structure. As depicted in FIG. 4A, the power transmission device 100 includes a plurality of power transmission coils 110 (in this example, seven power transmission coils 110a to 110g) arranged in a line. Each power transmission coil has a shape with a shorter side in an array direction (a lateral direction in the drawing) and a longer side in a direction perpendicular to the array direction. Though not depicted in the drawing, the power transmission device 100 also includes a power transmission circuit that supplies AC power to each power transmission coil and a control circuit that controls a connection state between the power transmission circuit and each power transmission coil.

When a power receiving device 200 provided with a power receiving coil 210 approaches this power transmission device 100, the control circuit electrically connects two power transmission coils closest to the power receiving coil 210 and the power transmission circuit. For example, in the state depicted in FIG. 4B, only two power transmission coils 110c and 110d are connected to the power transmission circuit. In the state depicted in FIG. 4C, only two power transmission coils 110f and 110g are connected to the power transmission circuit. In this example, power is supplied to two power transmission coils at all times, but the number of power transmission coils to which power is supplied at the same time may be a number other than 2. The number of power transmission coils to which power is supplied at the same time simply has to be smaller than the total number of power transmission coils. As described above, by limiting the number of power transmission coils to which power is supplied at the same time to a specific number, it is possible to suppress fluctuations in inductance. Moreover, by setting the number of power transmission coils to which power is supplied at the same time to a small number such as 2, a reduction in the size of the device is achieved because there is no need to increase the inductance of each power transmission coil excessively.

As described above, it is possible to achieve a reduction in the thickness or size of the power transmission device in this manner.

Hereinafter, a more detailed embodiment of the present disclosure will be described.

Embodiment 1

[1. General Configuration]

Figure 5A:
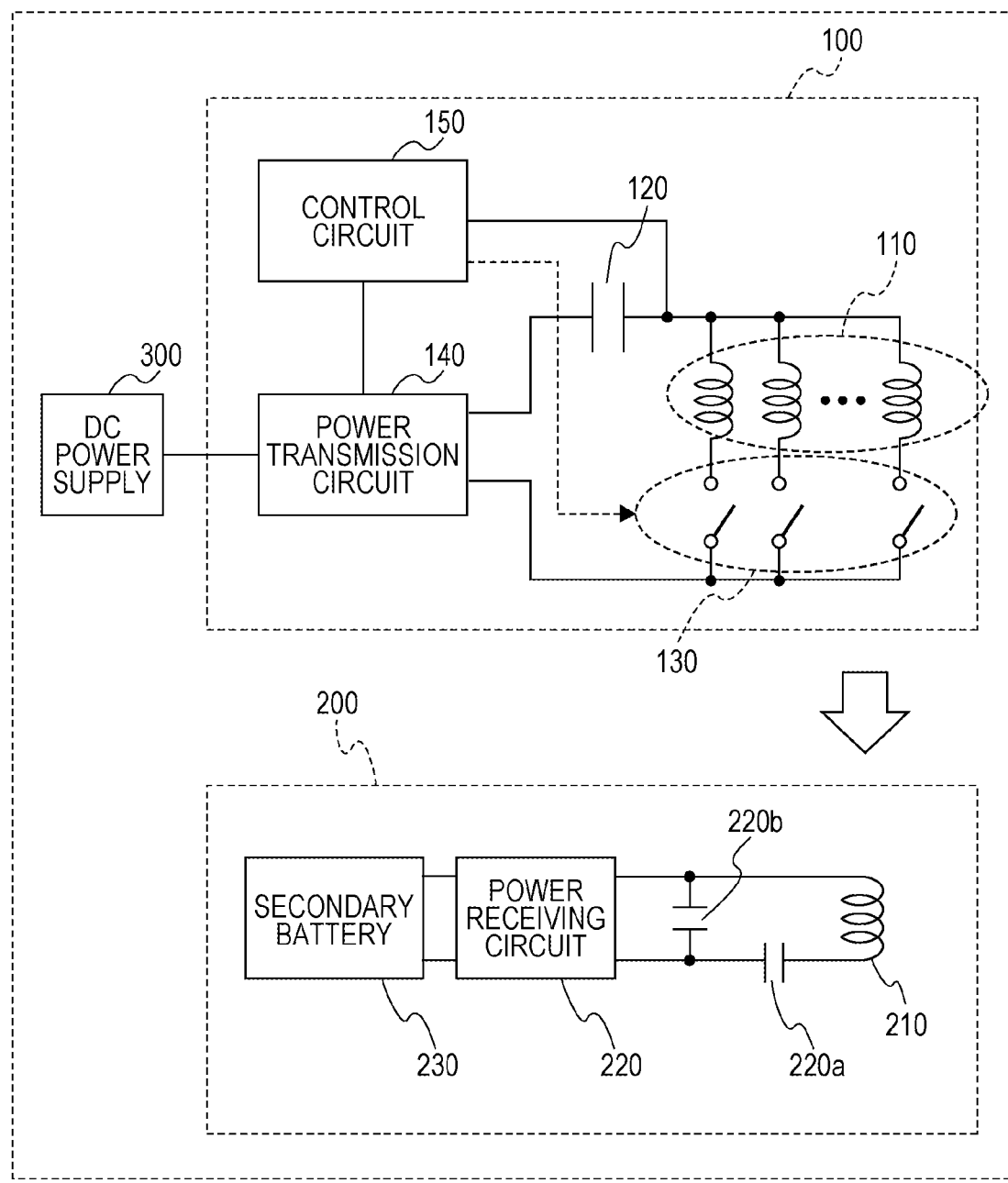
FIG. 5A is a diagram depicting the schematic configuration of a wireless power transmission system in Embodiment 1 of the present disclosure.

FIG. 5A is a block diagram depicting the schematic configuration of a wireless power transmission system according to Embodiment 1 of the present disclosure. The wireless power transmission system includes a power transmission device 100 and a power receiving device 200.

The power transmission device 100 wirelessly transfers the power from plurality of power transmission coils 110 to a power receiving coil 210 of a power receiving device 200.

The power receiving device 200 includes the power receiving coil 210, capacitors 220a and 220b, a power receiving circuit 220, and a secondary battery 230. The power receiving coil 210 and the capacitors 220a and 220b form a serial and parallel resonance circuit. The power receiving circuit 220 rectifies the AC power received by the power receiving coil 210 and outputs the resultant power.

The secondary battery 230 is charged with the DC power output from the power receiving circuit 220. The energy accumulated in the secondary battery 230 is consumed by an unillustrated load.

The power receiving circuit 220 may include various circuits such as a rectifier circuit, a frequency conversion circuit, a constant voltage and constant current control circuit, and a modulation and demodulation circuit for communication. The power receiving circuit 220 is configured so as to convert the received AC energy (power) into DC energy (power) or low-frequency AC energy (power) which can be used by the load. Various sensors that measure the voltage, the current, and so forth which are output from the power receiving coil 210 may be provided in the power receiving circuit 220.

Figure 5B:
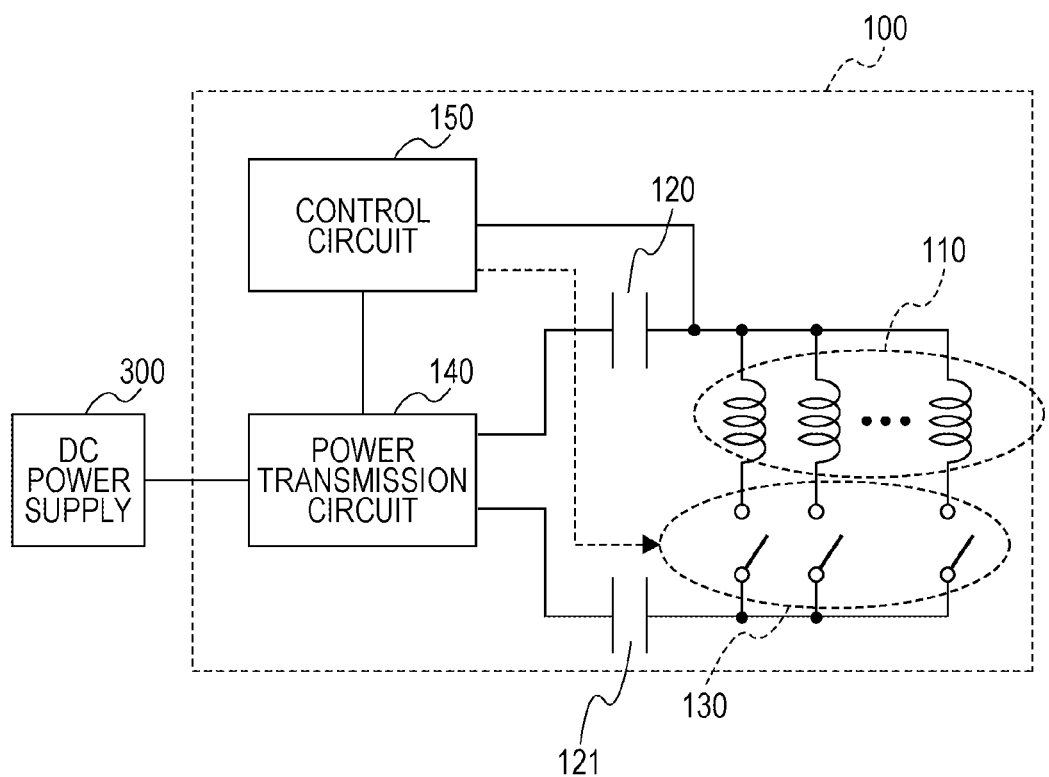
FIG. 5B is a diagram depicting a modified example of a power transmission device in Embodiment 1.

The power transmission device 100 includes the plurality of power transmission coils 110, a plurality of switches 130, a resonant capacitor 120, a power transmission circuit 140, and a control circuit 150. Each of the plurality of switches 130 is connected to a corresponding one of the plurality of power transmission coils 110. Here, "to be connected" means that a switch is connected to a power transmission coil in such a way that there is electrical continuity therebetween. The plurality of power transmission coils 110 are connected in parallel with respect to the power transmission circuit 140 via the plurality of switches 130. One end of each power transmission coil is connected to one electrode of the capacitor 120. The other electrode of the capacitor 120 is connected to the power transmission circuit 140. Each of the plurality of switches 130 is connected to a terminal of a corresponding one of the plurality of power transmission coils 110 on the side thereof to which the capacitor 120 is not connected. This is because the voltage between the capacitor 120 and each of the plurality of power transmission coils 110 fluctuates greatly. Incidentally, as depicted in FIG. 5B, another resonant capacitor 121 may be connected between the switches 130 and the power transmission circuit 140. By providing the two capacitors 120 and 121 at both ends of each coil, it is possible to reduce the voltage which is applied to each coil. This makes it possible to use a low-voltage switch.

Each power transmission coil 110 may be a thin planar coil formed of a substrate pattern, for example. The power transmission coil 110 does not have to be formed of a single-layered electric conductor pattern and may have a configuration in which a plurality of stacked electric conductor patterns are connected in series, the configuration depicted in FIG. 18 of U.S. Pat. No. 8,629,654, for example. A coil having such a configuration is referred to as a "multi-layer wiring coil". In addition to that described above, a winding coil using a copper wire, a Litz wire, a twisted wire, or the like can also be used. The Q value of each power transmission coil can be set at 100 or greater, for example, but may also be set at a value smaller than 100. The capacitors 120, 220a, and 220b may be provided if necessary. It is also possible to use the self-resonant characteristics of each coil in place of these capacitors.

Figure 6:
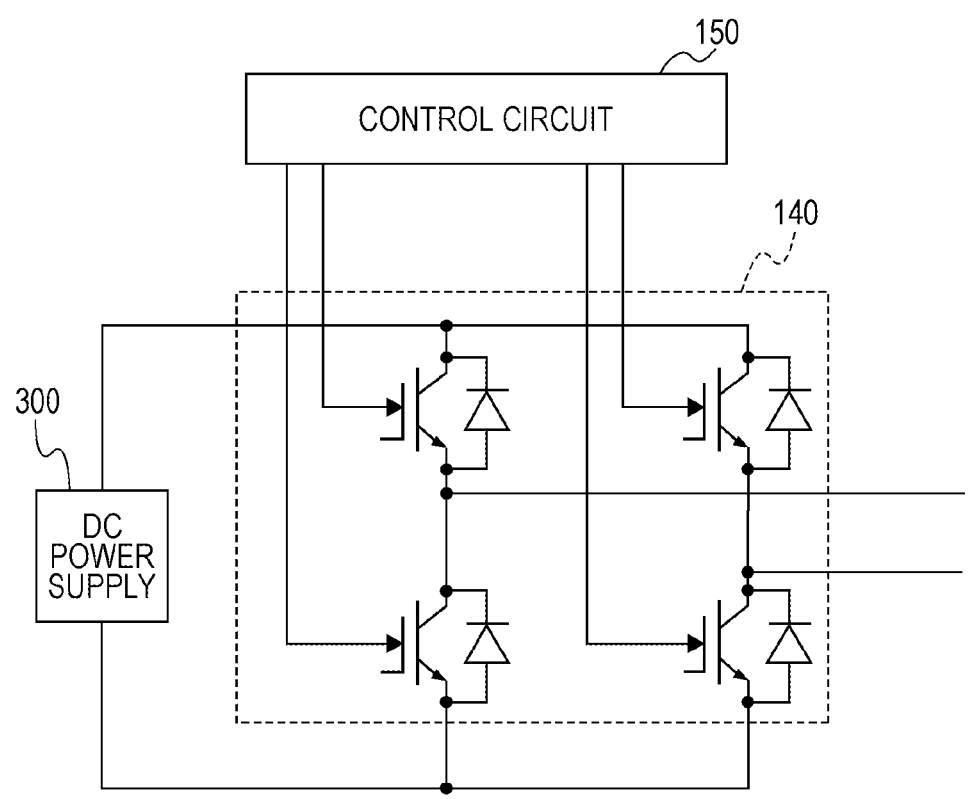
FIG. 6 is a diagram depicting an example of a power transmission circuit.

The power transmission circuit 140 may be, for example, a full-bridge inverter or a D-class or E-class oscillation circuit. FIG. 6 depicts an example in which the power transmission circuit 140 is formed as a full-bridge inverter. The power transmission circuit 140 may have a modulation and demodulation circuit for communication and various sensors that measure the voltage, the current, and so forth. The power transmission circuit 140 is connected to an external DC power supply 300. The power transmission circuit 140 converts the DC power input from the DC power supply 300 into AC power and outputs the resultant AC power. This AC power is sent out into space by the two power transmission coils selected from among the plurality of power transmission coils 110.

The frequency at the time of power transmission is set at the same value as the resonance frequency of a power transmission resonator formed of the power transmission coils 110 and the capacitor 120, for example. However, the frequency at the time of power transmission is not limited thereto and may be set at a value within a range of about 85% to 115% of the resonance frequency of the power transmission resonator, for example. The frequency band of power transmission can be set at a value within a range of 100 to 200 kHz, for example, but may be set at a value out of the above range.

The power supply 300 may be a commercial power supply, a primary battery, a secondary battery, a solar battery, a fuel cell, a universal serial bus (USB) power supply, a high-capacity capacitor (for example, an electric double layer capacitor), a voltage converter connected to the commercial power supply, or a combination thereof.

The control circuit 150 is a processor that controls the overall operation of the power transmission device 100. The control circuit 150 can be implemented by, for example, a combination of a CPU and memory storing a computer program. The control circuit 150 may be a dedicated integrated circuit configured so as to implement the operation of this embodiment. The control circuit 150 performs power transmission control (adjustment of a power transmission state) by the power transmission circuit 140 and control of the opening and closing state of the plurality of switches 130.

The control circuit 150 further detects the relative position of the power receiving coil 210 with respect to the plurality of power transmission coils 110. In addition thereto, the control circuit 150 may detect a foreign substance, such as metal, which is close to the power transmission coil 110. The detection of the position of the power receiving coil 210 and the detection of a foreign substance can be performed based on the measurement value of a parameter which varies with a change in impedance, such as the voltage, current, frequency, and inductance on the circuit. More specifically, the control circuit 150 sequentially turns on a given number of switches 130 (for example, two switches 130) at a time and measures any one of the parameters described above every time the control circuit 150 turns on the given number of switches 130. When a value out of a specified range is obtained by measurement, the control circuit 150 can determine that the power receiving coil 210 or a foreign substance is present near the power transmission coil to which power is being supplied at the time of measurement. In order to make such detection possible, the control circuit 150 may include an unillustrated detection circuit. In the present disclosure, the detection of the power receiving coil 210 and the detection of a foreign substance are not limited to a particular method and can be performed by any publicly known method.

The control circuit 150 in this embodiment selects two power transmission coils which are used in power transmission according the relative position of the power receiving coil 210 with respect to the plurality of power transmission coils 110. Then, the control circuit 150 switches the conduction state of the plurality of switches 130 such that AC power is supplied only to the selected two power transmission coils from the power transmission circuit 140. As a result, the AC energy is sent out into space from the selected two power transmission coils.

The control circuit 150 may have a communication circuit that performs communication with the power receiving device 200. With the communication circuit, it is possible to obtain, for example, information indicating fluctuations in the impedance of a load of the power receiving device 200. Based on this information, the control circuit 150 can give an instruction to the power transmission circuit 140 to change a power transmission parameter such that a fixed voltage is supplied to the load, for example. Such a power transmission parameter may be, for example, a frequency, a phase difference between a switching element pair of an inverter, or an input voltage of the inverter. When the input voltage is adjusted, the power transmission circuit 140 may have a DC/DC converter between the DC power supply 300 and the inverter. By changing these power transmission parameters, it is possible to change the voltage which is supplied to the load.

The power transmission device 100 may include an element other than the component elements described above. For example, the power transmission device 100 may include a display element that displays the result of detection of the power receiving coil 210 or a foreign substance performed by the control circuit 150. Such a display element may be, for example, a light source such as an LED. Moreover, an oscillation circuit and a detection coil for detecting a foreign substance may be provided.

Moreover, the configuration of the power receiving device 200 is not limited to the configuration depicted in FIG. 5A. As long as the power receiving device 200 has the power receiving coil 210 that receives at least part of the energy which is sent out from the power transmission coils 110, the configuration thereof may be arbitrarily designed.

[2. Configuration of the Power Transmission Coils]

Next, the detailed configuration of the plurality of power transmission coils 110 in this embodiment will be described.

Figure 7:
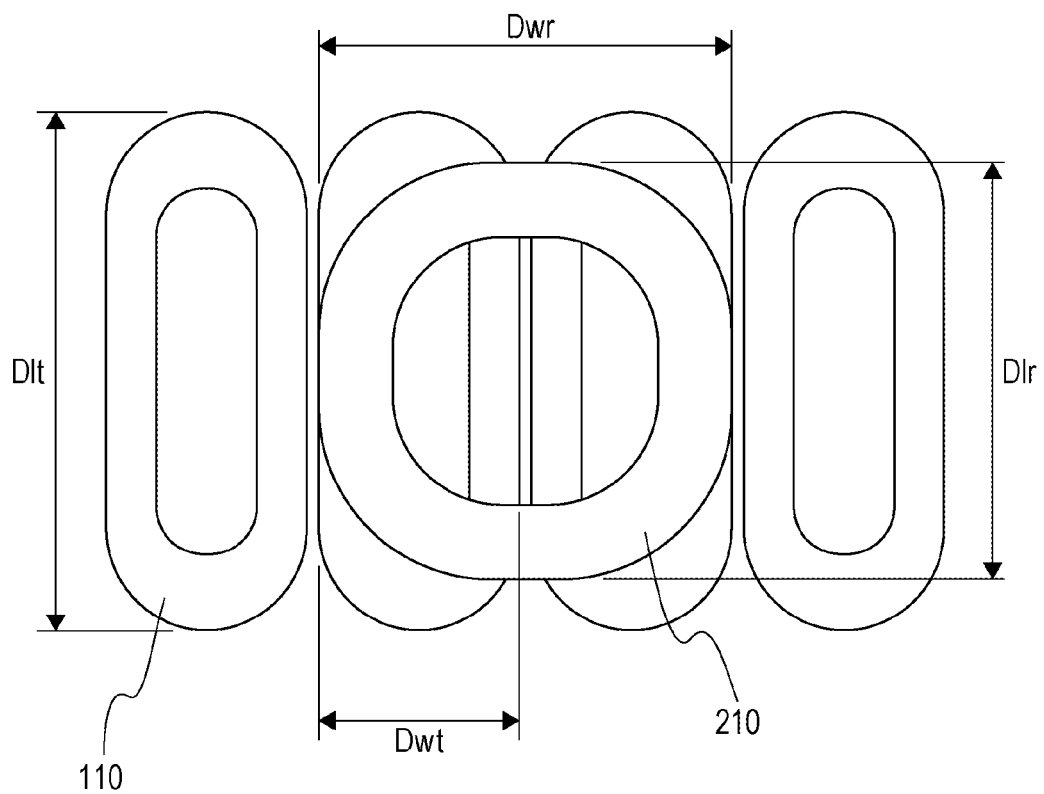
FIG. 7 is a diagram depicting the placement relationship between a plurality of power transmission coils and a power receiving coil.
Figure 8A:
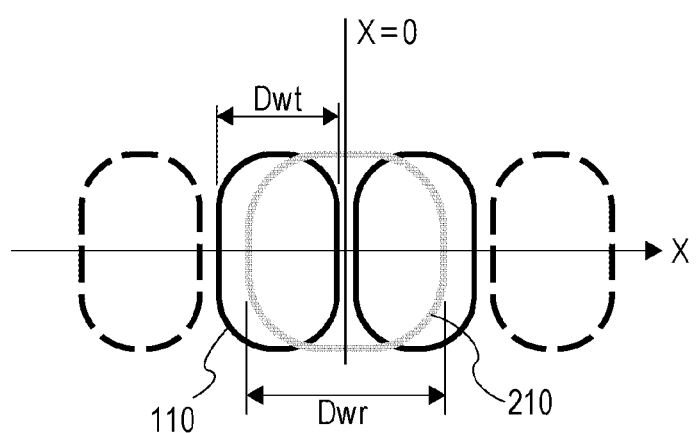
FIGS. 8A and 8B are diagrams, each depicting the state of the position of the center of the power receiving coil.
Figure 8B:
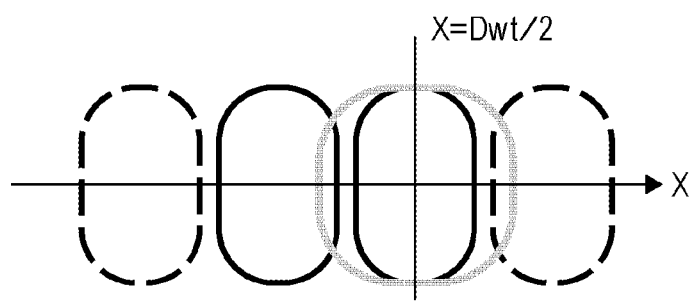

FIG. 7 is a diagram for explaining the relationship between the size of each of the plurality of power transmission coils 110 and the size of the power receiving coil 210. In FIG. 7, for the sake of simplification, each coil is depicted in the form of a donut; in actuality, each coil has a structure including a winding and two leads. Also in the subsequent drawings, each coil is simplified in a similar fashion. In FIGS. 8A and 8B, four power transmission coils 110 are depicted as an example, but more power transmission coils 110 may be provided.

The plurality of power transmission coils 110 in this embodiment are arranged in a line in a plane. As depicted in FIG. 10, the plane means a glass epoxy substrate, for example. The plane is in parallel to a surface of the power transmission device. Hereinafter, this array direction is referred to as a first direction. The width (also referred to as the length) Dwt of each power transmission coil in the first direction is shorter than the width Dwr of the power receiving coil 210.

On the other hand, in a direction (hereinafter referred to as a "second direction") perpendicular to the first direction in the above-described plane, the width (also referred to as the length) Dlt of each power transmission coil is longer than the width Dlr of the power receiving coil 210 in order to prevent a reduction in the charging performance even when the power receiving coil 210 is slightly displaced in the second direction.

In the example depicted in FIG. 7, $Dwt \approx Dwr/2$, but the relationship between Dwt and Dwr simply has to satisfy Dwt<Dwr. Incidentally, the width Dwr of the power receiving coil 210 corresponds to the "maximum diameter"

described above. When the power receiving coil 210 is circular, the maximum diameter Dwr corresponds to a diameter.

The inventors of the present disclosure studied the preferred size ratio between the power transmission coil and the power receiving coil 210 when the number of power transmission coils to which power is supplied is limited to two. As a result, the inventors have found out that it is possible to ensure an especially high coupling coefficient when 0.2≤Dwt/Dwr≤0.7. Hereinafter, the above findings will be explained.

Figure 9:
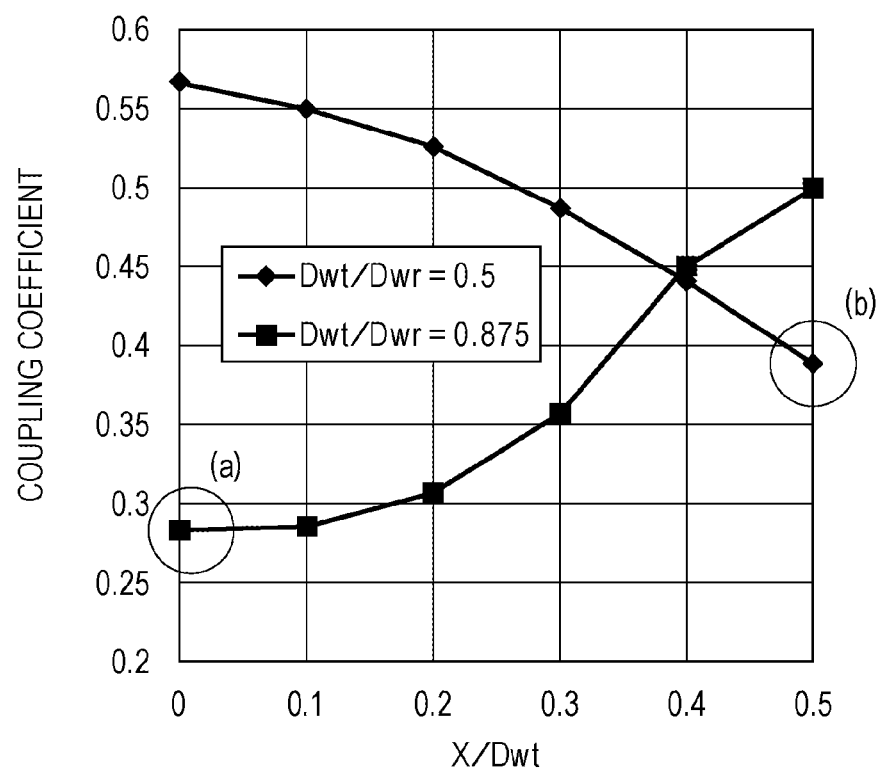
FIG. 9 is a graph depicting the dependence of a coupling coefficient on the position of the power receiving coil.

FIGS. 8A and 8B and FIG. 9 are diagrams for explaining how a coupling coefficient differs depending on the positional relationship between the power transmission coils 110 and the power receiving coil 210. FIG. 8A depicts a state in which the center of the power receiving coil 210 is located at a point midway between the adjacent two power transmission coils 110. At this time, the X coordinate of the center of the power receiving coil 210 is 0 (X=0). FIG. 8B depicts a state in which the center of the power receiving coil 210 is located on the center of one of the power transmission coils 110. At this time, the X coordinate of the center of the power receiving coil 210 is Dwt/2 (X=Dwt/2).

FIG. 9 is a graph depicting a change in the coupling coefficient when X/Dwt is changed between 0 and 0.5. This graph depicts the results of calculation performed for two cases: Dwt/Dwr=0.5 and Dwt/Dwr=0.875.

Figure 10A:
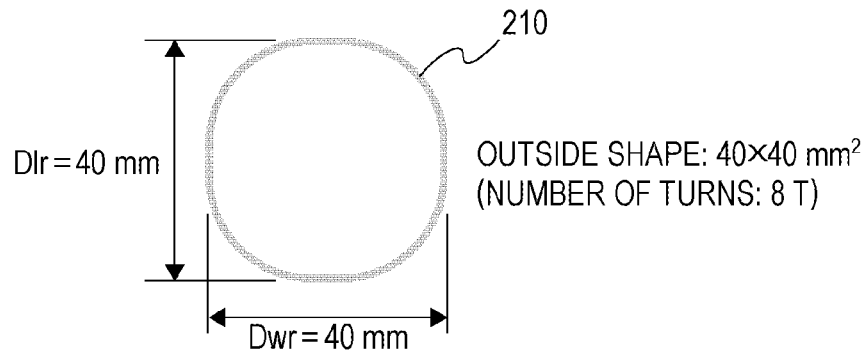
FIGS. 10A to 10C are diagrams depicting analysis conditions.
Figure 10B:
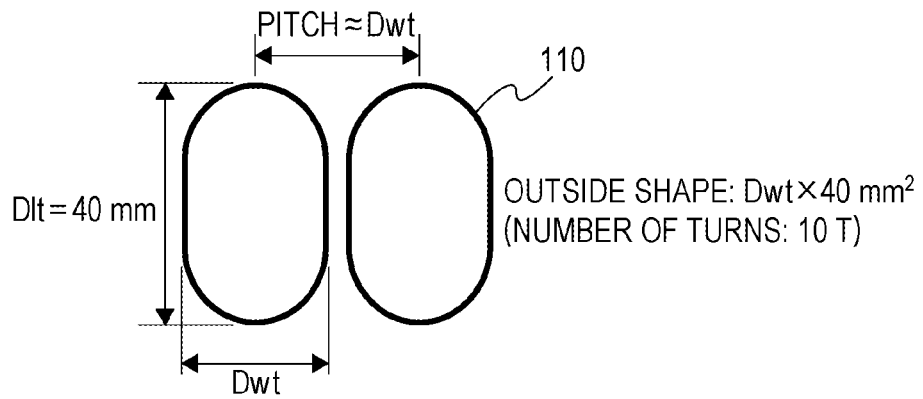
Figure 10C:
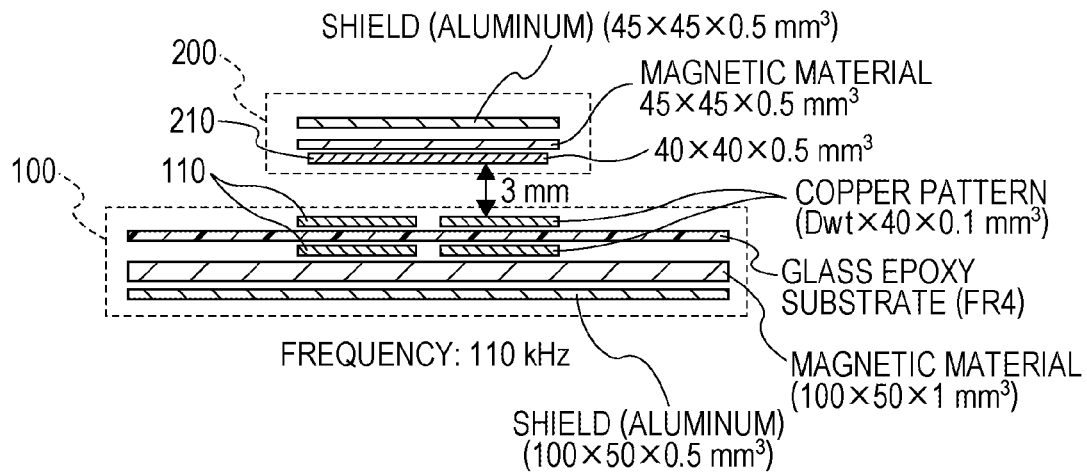

FIGS. 10A to 10C depict analysis conditions in this calculation. In this calculation, as depicted in FIG. 10A, the power receiving coil 210 has a circular winding (the number of turns: 8) having a size of 40 mm×40 mm. As depicted in FIG. 10B, the power transmission coil 110 has an elliptical winding (the number of turns: 10) of a size of Dwt [mm]×40 mm. The number of power transmission coils 110 was set at 2 and the interval (pitch) between the power transmission coils 110 was set at a value which is almost the same as Dwt.

FIG. 10C is a sectional view schematically depicting the configuration and placement of the power transmission device 100 and the power receiving device 200 assumed in this analysis. As depicted in FIG. 10C, each power transmission coil is formed of a coil pattern formed on both faces of a glass epoxy substrate (FR4) by using copper. A magnetic material is provided on a side of the power transmission coil 110 where the back thereof is located, and an aluminum shield is further provided. As for the power receiving coil 210, likewise, a magnetic material and an aluminum shield are placed on a side thereof which does not face the power transmission coil 110. The distance between the power transmission coil 110 and the power receiving coil 210 was set at 3 mm. In this configuration, AC magnetic fields of the same phase, the AC magnetic fields of a frequency of 110 kHz, were generated from the two power transmission coils 110.

As is clear from the results depicted in FIG. 9, if Dwt/Dwr=0.5 and X/Dwt=0.5, the coupling coefficient became minimum. If Dwt/Dwr=0.5 and X/Dwt=0, the coupling coefficient became maximum. That is, if Dwt/Dwr=0.5, the coupling coefficient became minimum when a center of the power transmission coil 110 corresponds to a center of the power receiving coil 210 when viewed from a direction of center axes of the power transmission coils and the power receiving coil as depicted in FIG. 8B.

Also if Dwt/Dwr=0.5, the coupling coefficient became maximum if a center of the power receiving coil 210 corresponds to a middle point between the adjacent two power transmission coils 110 when viewed from a direction of center axes of the power transmission coils and the power receiving coil as depicted in FIG. 8A.

Hereinafter, the reason will be described.

Generally, as a position relation between a wiring area of the power transmission coil 110 and a wiring area of the power receiving coil 210 becomes closer, the coupling coefficient between the power transmission coil 110 and the power receiving coil 210 becomes larger. Here, a wiring area of coil means an area where a winding wire exists.

Considering to simplify, what a position relation between a wiring area of the power transmission coil 110 and a wiring area of the power receiving coil 210 becomes closer means that an area where a wiring area of the power transmission coil 110 overlaps with a wiring area of the power receiving coil 210 when viewed from a direction of center axes of the power transmission coils and the power receiving coil becomes larger.

Therefore, the coupling coefficient becomes maximum if a center of the power transmission coil 110 corresponds to the power receiving coil 210 when viewed from a direction of center axes of the power transmission coils and the power receiving coil, a size of the power transmission coil 110 being same size of the power receiving coil 210.

If Dwt/Dwr=0.5, a width of the power receiving coil 210 becomes two times of width of the power transmission coil 210 (two times of width equals a width of the two power transmission coil). If the center of the power receiving coil 210 corresponds to the power transmission coil 110 when viewed from a direction of center axes of the power transmission coils and the power receiving coil, the position relation between the wiring area of the power transmission coil 110 and the wiring area of the power receiving becomes the farthest position relation. Then the area where the wiring area of the power transmission coil 110 overlaps with the wiring area of the power receiving coil 210 becomes smallest. At the time, the coupling coefficient becomes minimum.

Also if the center of the power receiving coil 210 corresponds to the middle point between the adjacent two power transmission coils 110 when viewed from a direction of center axes of the power transmission coils and the power receiving coil, the position relation between the wiring area of the power transmission coil 110 and the wiring area of the power receiving becomes the nearest position relation. Also the area where the wiring area of the power transmission coil 110 overlaps with the wiring area of the power receiving coil 210 becomes largest. At the time, the coupling coefficient becomes maximum.

Next, if Dwt/Dwr=0.875 and X/Dwt=0, the coupling coefficient became minimum. If Dwt/Dwr=0.875 and X/Dwt=0.5, the coupling coefficient became maximum. That is, if Dwt/Dwr=0.875, the coupling coefficient became minimum when the center of the power transmission coil 110 corresponds to the middle point between the adjacent two power transmission coils 110 when viewed from a direction of center axes of the power transmission coils and the power receiving coil as depicted in FIG. 8A. As depicted in FIG. 8B, also if the center of the power transmission coil 110 corresponds to the center of the power receiving coil 210 when viewed from a direction of center axes of the power transmission coils and the power receiving coil, the coupling coefficient became maximum.

Hereinafter, the reason will be described.

If Dwt/Dwr=0.875, a width of the power receiving coil 210 becomes almost same width of the power transmission coil 210 (almost same width equals a width of the one power transmission coil).

Then if the center of the power receiving coil 210 corresponds to the middle point between the adjacent two power transmission coils 110 when viewed from a direction of center axes of the power transmission coils and the power receiving coil, the position relation between the wiring area of the power transmission coil 110 and the wiring area of the power receiving becomes the furthest position relation. Then the area where the wiring area of the power transmission coil 110 overlaps with the wiring area of the power receiving coil 210 becomes smallest. At the time, the coupling coefficient becomes minimum.

Also if the center of the power transmission coil 110 corresponds to the center of the power receiving coil 210 when viewed from a direction of center axes of the power transmission coils and the power receiving coil, the position relation between the wiring area of the power transmission coil 110 and the wiring area of the power receiving becomes the nearest position relation. Then the area where the wiring area of the power transmission coil 110 overlaps with the wiring area of the power receiving coil 210 becomes largest. At the time, the coupling coefficient becomes maximum.

A first case and a second case are two most extreme samples within position relations that the power transmission coil and the power receiving coil are able to exist in the array direction (first direction), the first case being a case that the center of the power receiving coil 210 corresponds to the middle point between the adjacent two power transmission coils 110 when viewed from a direction of center axes of the power transmission coils and the power receiving coil as depicted in FIG. 8A (X/Dwt=0) and the second case being a case that the center of the power transmission coil 110 corresponds to the center of the power receiving coil 210 when viewed from a direction of center axes of the power transmission coils and the power receiving coil as depicted in FIG. 8B (X/Dwt=0.5).

If X/Dwt<0 or X/Dwt>0.5, adjacent two coils in the closest distance from the power receiving coil are selected again among a plurality of the power transmission coils. By above-mentioned method, the position relation of selected adjacent two coils becomes a same position relation between power transmission coil and the power receiving, the same position relation satisfying a range of 0≤X/Dwt≤0.5.

Therefore upon considering the range of 0≤X/Dwt≤0.5, all position relations between the power transmission coil and the power receiving coil are considered in the array direction (first direction). And positions of X/Dwt=0 and X/Dwt=0.5 are both ends of range where the power receiving coil are able to exist in the array direction.

The coupling coefficient between the power transmission coil and the power receiving coil becomes maximum range where the power receiving coil 210 at any position of range of 0≤X/Dwt≤0.5.

To recognize two cases of Dwt/Dwr=0.5 and Dwt/Dwr=0.5, for example, if a position such that the coupling coefficient becomes maximum is X0 (X=X0), one of X/Dwt=0 and X/Dwt=0.5 becomes the farthest position from X=X0. And at the time, the coupling coefficient becomes minimum.

That is, whatever each size of the power transmission coil and the power receiving coil, the coupling coefficient between the power transmission coil and the power receiving coil becomes minimum in a first case and a second case, the first case being a case that the center of the power receiving coil 210 corresponds to the middle point between the adjacent two power transmission coils 110 when viewed from a direction of center axes of the power transmission coils and the power receiving coil as depicted in FIG. 8A and the second case being a case that the center of the power transmission coil 110 corresponds to the center of the power receiving coil 210 when viewed from a direction of center axes of the power transmission coils and the power receiving coil as depicted in FIG. 8B.

Thus, the inventors of the present disclosure calculated an optimum coil size ratio for each of these two cases such that the coupling coefficient becomes minimum. The inventors calculated a coupling coefficient for each of the case in which the center of the power receiving coil 210 is located at a point midway between the two power transmission coils and the case in which the center of the power receiving coil 210 is located on a central axis of one power transmission coil while changing the ratio between the power transmission coil width Dwt and the power receiving coil width Dwr.

Figure 11:
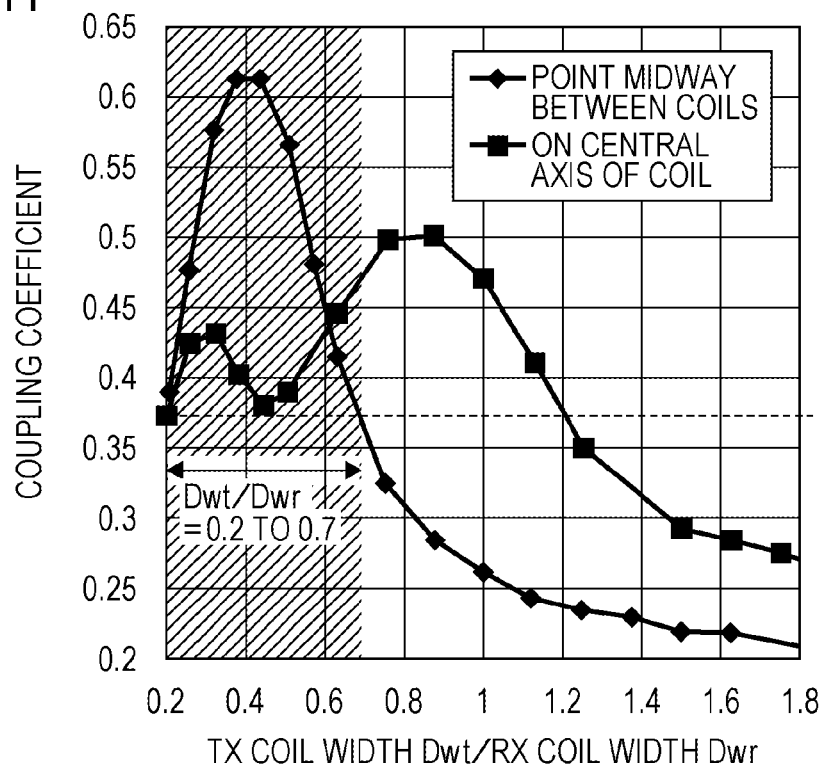
FIG. 11 is a graph depicting the dependence of a coupling coefficient on the ratio between the width of the power transmission coil and the width of the power receiving coil.

FIG. 11 is a graph depicting the results of this calculation. As depicted in this graph, the coupling coefficient became 0.37 or more in both cases when Dwt/Dwr is 0.2 or more but 0.7 or less, and satisfactory results were obtained.

Figure 12:
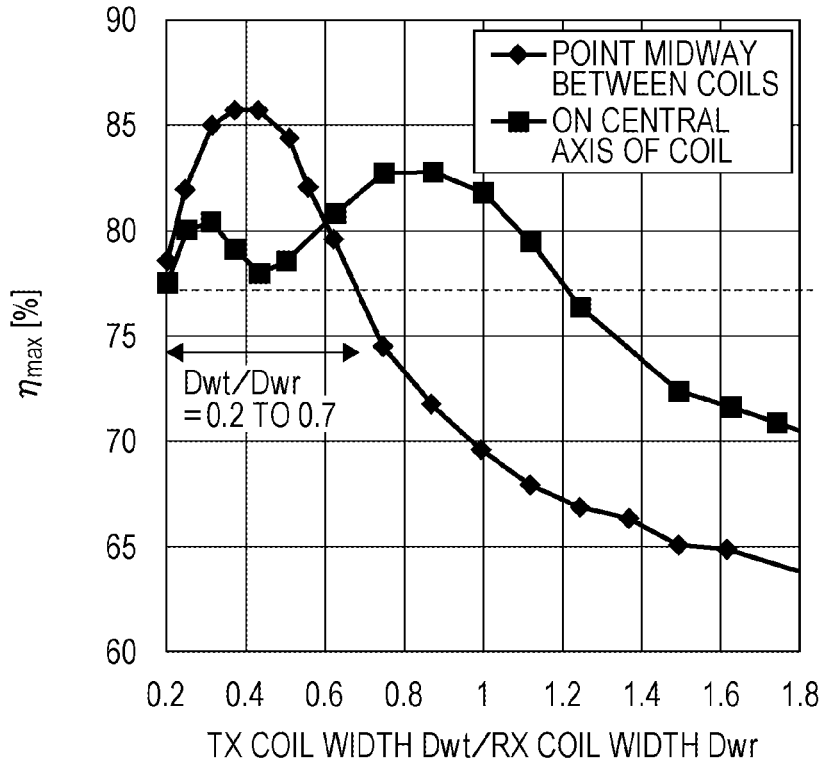
FIG. 12 is a graph depicting the dependence of the maximum transmission efficiency on the ratio between the width of the power transmission coil and the width of the power receiving coil.

FIG. 12 is a graph representing the results depicted in FIG. 11 as the maximum transmission efficiency $\eta_{max}$ between the coils. The maximum transmission efficiency $\eta_{max}$ is given by the following equation (1).

$$\eta_{max} = \frac{2 + k^2 Q_{Tx} Q_{Rx} - 2\sqrt{1 + k^2 Q_{Tx} Q_{Rx}}}{k^2 Q_{Tx} Q_{Rx}} \quad (1)$$

Here, k is a coupling coefficient, $Q_{Tx}$ is the Q value of a resonator formed of the power transmission coil 110 and the capacitor 120, and $Q_{Rx}$ is the Q value of a resonator formed of the power receiving coil 210 and the capacitors 220a and 220b. Incidentally, in this embodiment, since the Q value of the coil is lower than the Q value of the capacitor, the Q value of the resonator is nearly equal to the Q value of the coil. Under the conditions in this calculation, $Q_{Tx}$=15 and $Q_{Rx}$=30.

As is clear from FIG. 12, when Dwt/Dwr is 0.2 or more but 0.7 or less, irrespective of the position of the power receiving coil 210, the maximum transmission efficiency is 77% or more and can be maintained at a high value. Therefore, it has been confirmed that, also from the viewpoint of the transmission efficiency, it is preferable that Dwt/Dwr is 0.2 or more but 0.7 or less.

Next, the inventors of the present disclosure studied the preferred size ratio between the width Dlt of each power transmission coil and the width Dlr of the power receiving coil 210 in the second direction. As a result, the inventors have found out that, when 1.0≤Dwt/Dwr≤2.0, fluctuations in the coupling coefficient are relatively small even when the power receiving coil 210 is displaced in the second direction. Hereinafter, the above findings will be explained.

Figure 13A:
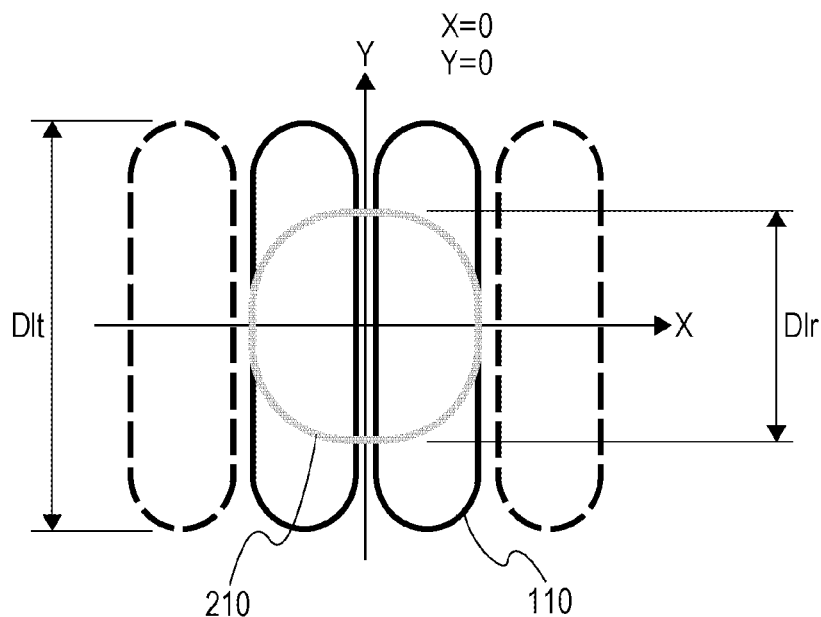
FIGS. 13A and 13B are diagrams, each depicting the state of the position of the center of the power receiving coil.
Figure 13B:
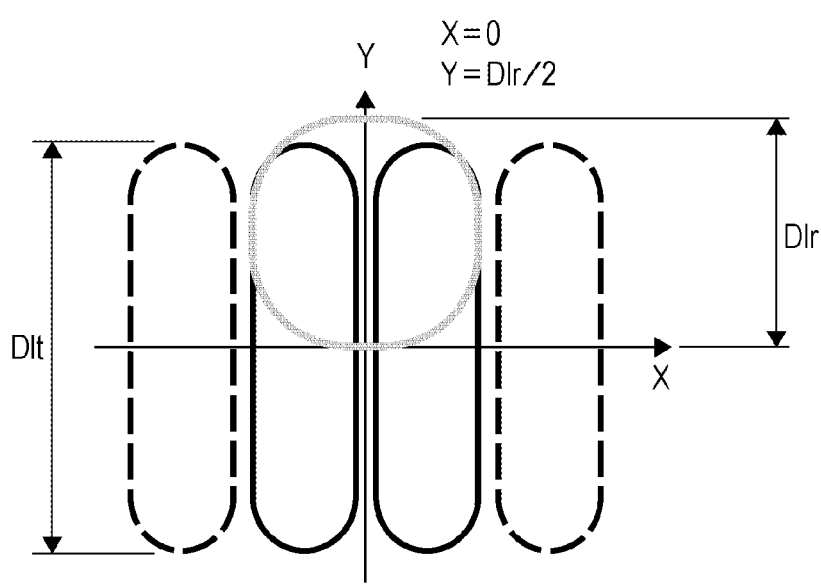

FIGS. 13A and 13B are diagrams, each depicting the positional relationship between the power transmission coils 110 and the power receiving coil 210 when the power receiving coil 210 is displaced in the second direction. When the power receiving coil 210 is displaced in the second direction, by making the width Dlt of the power transmission coil 110 greater than the width Dlr of the power receiving coil 210, it is possible to suppress a decline in the coupling coefficient caused by the displacement of the power receiving coil 210 in the second direction.

Figure 14:
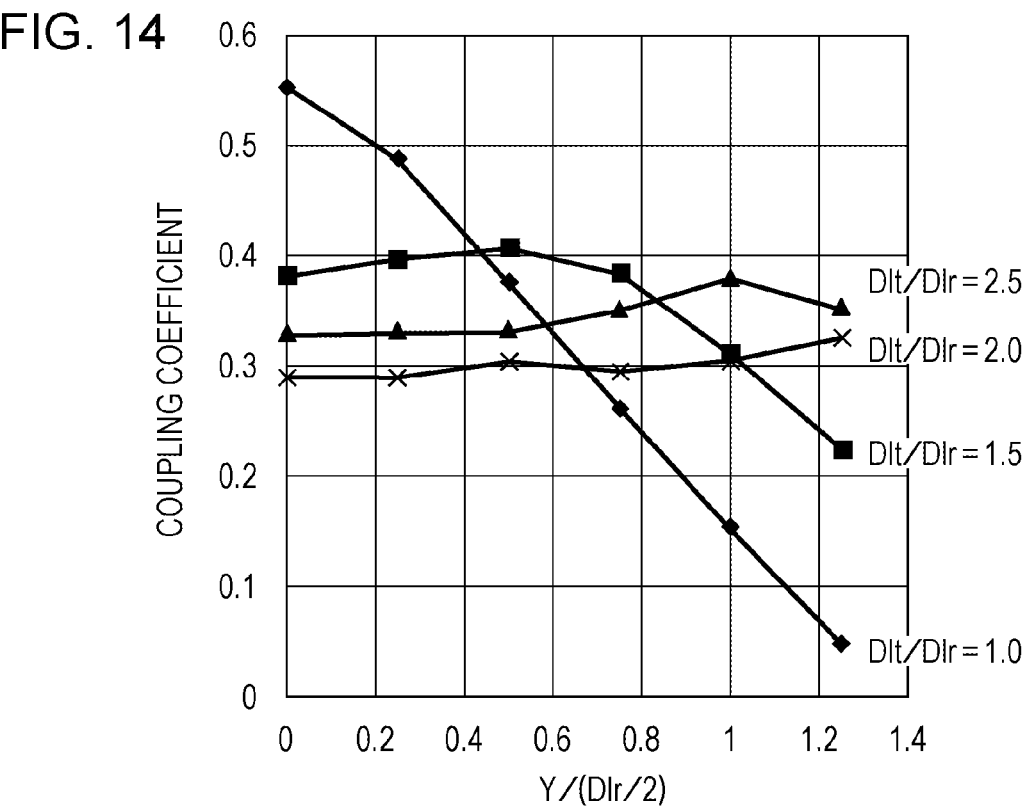
FIG. 14 is a graph depicting the dependence of a coupling coefficient on displacement of the power receiving coil in a second direction.

FIG. 14 is a graph of a change in the coupling coefficient calculated by electromagnetic field analysis, the change which is caused by the width Dlt of the power transmission coil 110 and is observed when the power receiving coil 210 is displaced in the second direction. The analysis conditions are the same as those in FIGS. 10A to 10C, and Dwt=Dwr× 0.3. However, the sizes of the shield, the magnetic material, the glass epoxy substrate, and so forth in the second direction are changed under the same conditions depending on the value of the width Dlt of the power transmission coil 110.

FIG. 14 reveals that, by making the width Dlt of the power transmission coil 110 greater than the width Dlr of the power receiving coil 210 (making Dlt/Dlr greater than 1), a decline in the coupling coefficient caused by the displacement of the power receiving coil 210 in the Y-axis direction is suppressed.

At that time, it reveals that, if the power receiving coil 210 is placed in a position in which Y=0, that is, if the power receiving coil 210 is placed in a right position facing two coils of the power transmission coils 110, the two coils which are driven, the coupling coefficient declines.

Therefore, when displacement in the second direction is permitted by making the width Dlt of the power transmission coil 110 greater than the width Dir of the power receiving coil 210, the value of the width Dlt of the power transmission coil 110 is determined based on the degree of decline in the coupling coefficient observed when the power transmission coils 110 and the power receiving coil 210 are placed in a right position so as to face each other.

Figure 15:
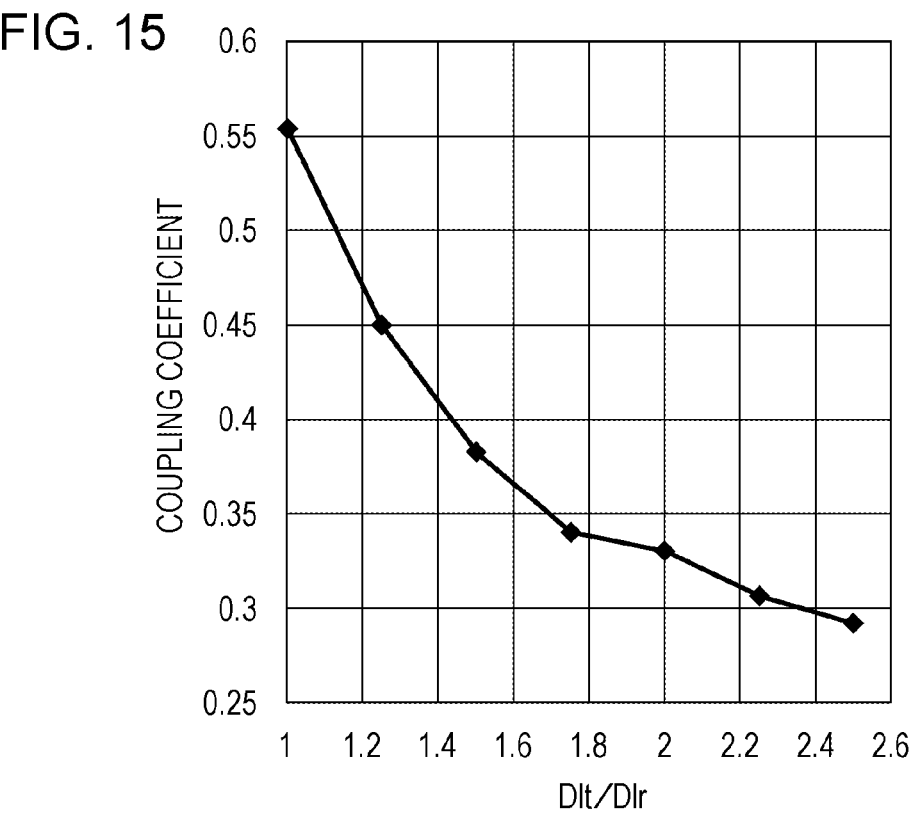
FIG. 15 is a graph depicting the dependence of a coupling coefficient on the ratio between the width of the power transmission coil and the width of the power receiving coil with respect to the second direction.

FIG. 15 is a graph of the coupling coefficient based on the value of the width Dlt of the power transmission coil 110, the coupling coefficient calculated when the power transmission coils 110 and the power receiving coil 210 are placed in a right position so as to face each other. As depicted in this graph, satisfactory results were obtained when Dlt/Dlr was 1.0 or more but 2.0 or less. Dlt/Dlr exceeding 2.0 is not desirable because the coupling coefficient declines sharply if Dlt/Dlr exceeds 2.0.

Figure 16:
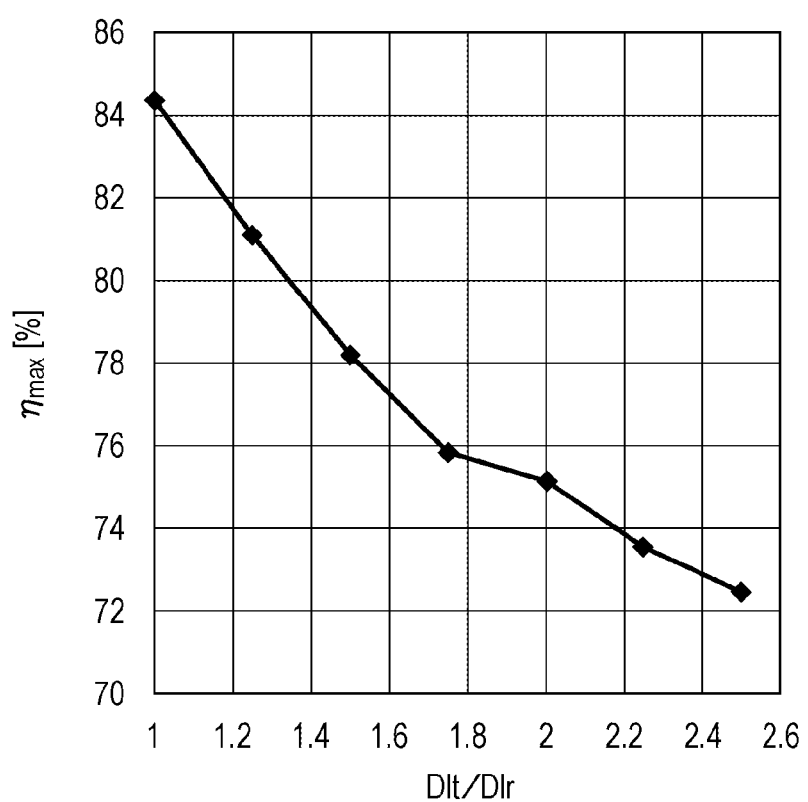
FIG. 16 is a graph depicting the dependence of the maximum transmission efficiency on the ratio between the width of the power transmission coil and the width of the power receiving coil with respect to the second direction.

FIG. 16 is a graph representing the results depicted in FIG. 15 as the maximum transmission efficiency $\eta_{max}$ between the coils. The conditions are the same as those in FIG. 12.

As is clear from FIG. 16, when Dlt/Dlr is 1.0 or more but 2.0 or less, the maximum transmission efficiency is 75% or more and can be maintained at a high value. Dlt/Dlr exceeding 2.0 is not desirable because the maximum transmission efficiency declines sharply if Dlt/Dlr exceeds 2.0.

Thus, it has been confirmed that, also from the viewpoint of the transmission efficiency, it is preferable that Dlt/Dlr is 1.0 or more but 2.0 or less.

The fluctuations in the coupling coefficient observed when the power receiving coil 210 is displaced in the second direction indicate a similar tendency irrespective of the value of Dwt, the number of feeder coils, and displacement in the first direction. Therefore, in the above results, descriptions have been given by taking up, as an example, a case in which the number of coils to which power is supplied, the coils of the power transmission coils for which settings are made such that Dwt=Dwr×0.3, is 2 and there is no displacement in the first direction (X=0), but the results are not limited to those conditions.

[3. Operation]

Figure 17:
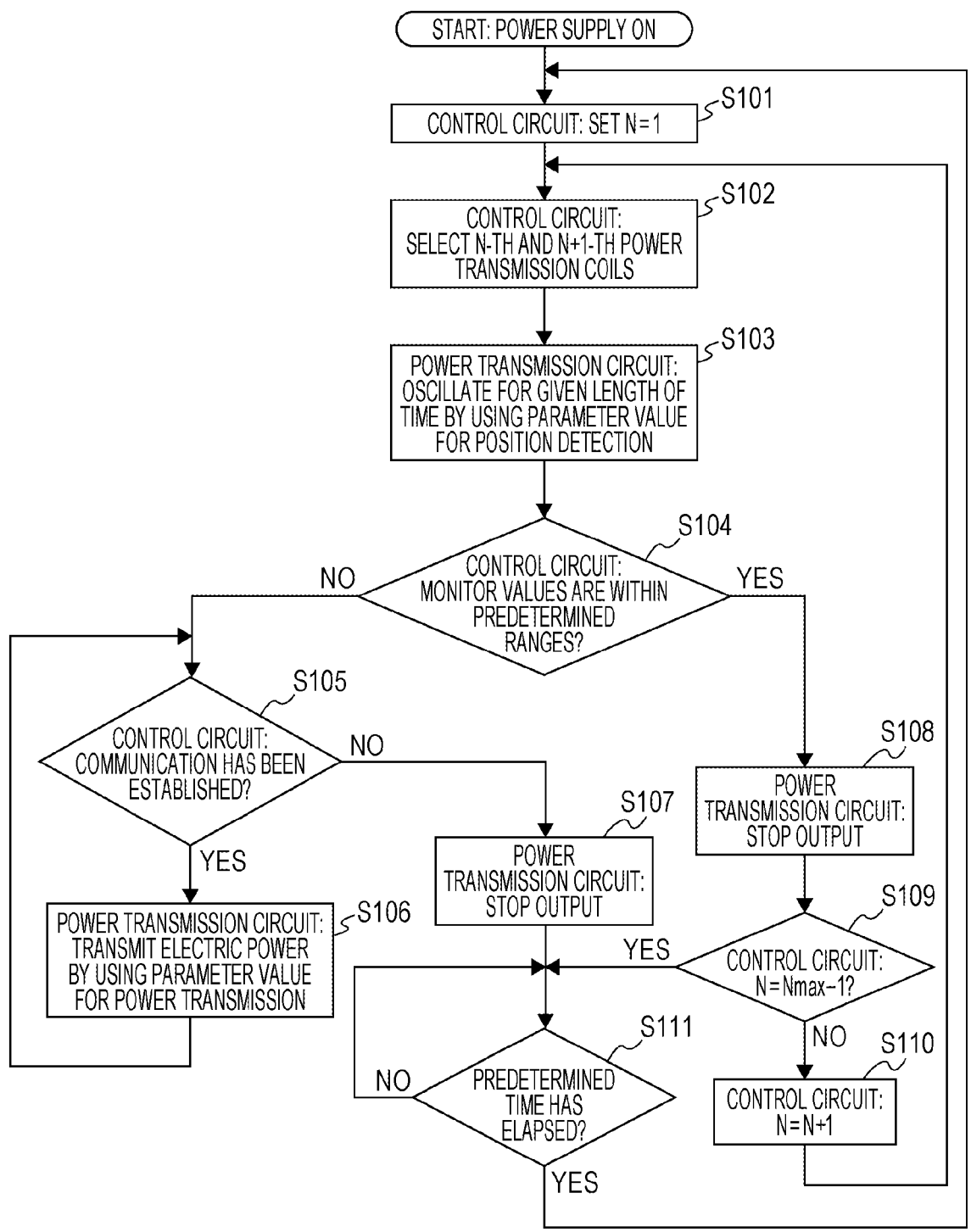
FIG. 17 is a diagram depicting an example of a flowchart of the operation of the power transmission device in Embodiment 1.

Next, with reference to a flowchart of FIG. 17, an example of the operation of the power transmission device 100 of this embodiment will be described.

When the power transmission device 100 is turned on, the control circuit 150 substitutes 1 into a variable N (step S101). The variable N indicates the number of the power transmission coil 110. The control circuit 150 selects, as a power transmission coil to which power is supplied, an N-th power transmission coil and an N+1-th power transmission coil (step S102). At this time, the control circuit 150 turns on only two switches connected to the selected two power transmission coils. Then, the power transmission circuit 140 sets a power transmission parameter at a value for position detection and oscillates for a given length of time (step S103). The parameters set here may include, for example, the frequency and the amount of phase shift between a switching element pair of an inverter or the input voltage of the inverter. The power transmission circuit 140 sets these parameters at values suitable for detection of the position of the power receiving coil and oscillates. Next, the control circuit 150 determines whether or not the monitor values of the current flowing through the circuit, the voltage, the impedance, and so forth are within predetermined ranges (step S104). If the monitor values are within the predetermined ranges, the power transmission circuit 140 stops output (step S108). Then, the control circuit 150 determines whether or not the variable N is equal to a value obtained by subtracting 1 from the number Nmax of power transmission coils (step S109). If N is not equal to Nmax−1, the control circuit 150 substitutes N+1 into the variable N (step S110). Then, steps S102 to S104 and S108 to S110 are repeated until the monitor values fall within the predetermined ranges or N=Nmax−1.

If it is determined in step S109 that N=Nmax−1, the power transmission device 100 waits until a predetermined time elapses (step S111). This is a step which is performed when significant changes in the monitor values are not detected after the completion of the determination performed on all the power transmission coils 110. At this time, since it can be considered that the power receiving coil 210 is not present in the neighborhood, the power transmission device 100 performs step S101 again after waiting for a predetermined time.

If it is determined in step S104 that the monitor values are out of the predetermined ranges, the control circuit 150 determines whether or not communication with the power receiving device 200 has been established (step S105). If communication has been established, the power transmission circuit 140 performs power transmission by using a parameter value for power transmission (step S106). This parameter value is a value suitable for power transmission and is set depending on a load (for example, a secondary battery) of the power receiving device 200. The control circuit 150 performs the operation in step S105 once every predetermined time during power transmission to check whether or not communication is interrupted.

If it is determined in step S105 that communication has not been established, the power transmission circuit 140 stops output (step S107). In this case, the power transmission device 100 waits until a predetermined time elapses (step S111). Then, the power transmission device 100 performs the operation in step S101 again.

As a result of the above-described operation, only when a state in which the power receiving coil 210 is approaching is detected, it is possible to transmit power by using the two power transmission coils closest to the power receiving coil 210. Detection of the power receiving coil 210 can be performed by intermittent oscillation (intermittent operation) by which several periods of AC are produced once every 1 millisecond to a few seconds, for example. Since switching to continuous operation is performed only when the power receiving coil 210 is detected, it is possible to suppress an increase in power consumption. The operating frequency of the power transmission circuit 140 in this detection operation may be the same as the frequency for power transmission or may be different therefrom.

According to this embodiment, the number of power transmission coils which are used for power transmission is always limited to a fixed number (two in the above-described example). Furthermore, the plurality of power transmission coils are arranged in a line, and the length of each power transmission coil in the array direction is shorter than the length of the power receiving coil. As a result, it is possible to achieve a reduction in the size of the power transmission device and implement high-efficiency power transmission.

Incidentally, in the embodiment described above, the number of power transmission coils which are used for power transmission is maintained at a fixed number at all times, but it does not necessarily have to be maintained at a fixed number. For example, the number of power transmission coils to which power is supplied may be changed depending on the size of the power receiving coil. If the width Dwt of the power transmission coil is ⅓ or less of the width Dwr of the power receiving coil, for example, three power transmission coils face the power receiving coil. In such a case, power may be supplied to three power transmission coils, not two power transmission coils.

The present disclosure includes a power transmission device and a wireless power transmission system provided with the power transmission device which are described in the following items.

[Item 1]

A power transmission device comprising:
power transmission coils arranged in a line such that each principal surface of the power transmission coils is in parallel to a surface of the power transmission device, the power transmission coils transmitting AC power wirelessly to a power receiving coil of a power receiving device;
a power transmission circuit that is connected to the power transmission coils and supplies the AC power to the power transmission coils; and
control circuitry operative to:
switch an electrical connection state between the power transmission circuit and each of the power transmission coils,
detect a relative position between the power receiving coil and each of the power transmission coils,
select the power transmission coils adjacent to each other from the transmission coils based on the detected relative position, thereby fixing a number of the selected power transmission coils, and
cause the power transmission circuit to supply the AC power to the selected power transmission coils,
wherein in an array direction of the power transmission coils, a length Dwt of each of the power transmission coils is shorter than a maximum diameter Dwr of the power receiving coil.

According to the above-described aspect, the relative position of the power receiving coil with respect to the plurality of power transmission coils is detected, two or more adjacent power transmission coils whose number is fixed, the two or more adjacent power transmission coils corresponding to the detected relative position of the power receiving coil, are selected by switching the connection state between the power transmission circuit and the plurality of power transmission coils, and the AC power is supplied to the selected at least two adjacent power transmission coils.

As a result, even when the power receiving coil moves in the array direction, it is possible to maintain the coupling coefficient between the power transmission coil and the power receiving coil at a high value. In addition, it is also possible to maintain the efficiency of power transmission between the power transmission coil and the power receiving coil at a high value. Therefore, since the number of turns or the number of stacked layers of each power transmission coil is not increased and it is not necessary to provide a large number of capacitors in each power transmission coil, it is possible to reduce the thickness or size of the power transmission device.

[Item 2]

The power transmission device according to Claim 1, wherein
in the array direction of the power transmission coils, the length Dwt of each of the power transmission coils is shorter than the maximum diameter Dwr of the power receiving coil and satisfies $0.2 \leq Dwt/Dwr \leq 0.7$.

According to the above-described aspect, by satisfying $0.2 \leq Dwt/Dwr \leq 0.7$, even when the power receiving coil moves in the array direction, it is possible to maintain the coupling coefficient between the power transmission coil and the power receiving coil at a high value. In addition, it is also possible to maintain the efficiency of power transmission between the power transmission coil and the power receiving coil at a high value.

[Item 3]

The power transmission device according to Item 1 or 2, wherein the power transmission coils whose number is fixed are two power transmission coils.

According to the above-described aspect, by setting the number of the power transmission coils to which power is supplied at the same time to a small number such as 2, a reduction in the size of the device is achieved because there is no need to increase the inductance of each power transmission coil excessively.

[Item 4]

The power transmission device according to one of Items 1 to 3, wherein the selected power transmission coils whose number is fixed generate magnetic fields of a same phase and are connected to the power transmission circuit.

[Item 5]

The power transmission device according to one of Items 1 to 4, wherein in a direction perpendicular to the array direction in the plane, a ratio Dlt/Dlr between a length Dlt of each of the power transmission coils and a length Dlr of the power receiving coil is 1.0 or more but 2.0 or less.

According to the above-described aspect, when the ratio (Dlt/Dlr) between the length (Dlt) of each power transmission coil and the length (Dlr) of the power receiving coil is 1.0 or more but 2.0 or less, the results indicating a satisfactory coupling coefficient are obtained. Dlt/Dlr exceeding 2.0 is not desirable because the coupling coefficient declines sharply if Dlt/Dlr exceeds 2.0.

Moreover, if Dlt/Dlr is 1.0 or more but 2.0 or less, the maximum transmission efficiency is 75% or more and can be maintained at a high value. Dlt/Dlr exceeding 2.0 is not desirable because the maximum transmission efficiency declines sharply if Dlt/Dlr exceeds 2.0.

Therefore, from the viewpoint of the coupling coefficient and the transmission efficiency, it is preferable that Dlt/Dlr is 1.0 or more but 2.0 or less.

[Item 6]

The power transmission device according to one of Items 1 to 5, wherein a length of each of the power transmission coils in the array direction is shorter than 24 mm, and a length of each of the power transmission coils in the plane in a direction perpendicular to the array direction is longer than 24 mm.

[Item 7]

The power transmission device according to one of Items 1 to 6, wherein the power transmission coils are connected in parallel with the power transmission circuit side by side, the power transmission device further includes switches which are placed between the power transmission circuit and the power transmission coils, and the control circuit switches the connection state between the power transmission circuit and the power transmission coils by switching a conduction state of switches.

According to the above-described aspect, since the magnetic fields radiated from the plurality of power transmission coils are not blocked by the power transmission circuit, it is possible to transmit power without a reduction in the transmission efficiency.

[Item 8]

The power transmission device according to one of Items 1 to 7, wherein each end of the power transmission coils is connected, each another end of the power transmission coils is connected to one of switches, and the power transmission device further includes a resonant capacitor which is connected between the each end of the power transmission coils and the power transmission circuit.

According to the above-described aspect, by using a capacitor, it is possible to reduce a voltage which is applied to each coil. This makes it possible to use a low-voltage switch.

[Item 9]

A wireless power transmission system comprising:

a power transmission device; and a power receiving device including a power receiving coil, wherein the power transmission device includes power transmission coils arranged in a line in a plane, a power transmission circuit that is connected to the power transmission coils and supplies AC power to the power transmission coils, and control circuitry operative to:

switch an electrical connection state between the power transmission circuit and each of the power transmission coils, detect a relative position between the power receiving coil and each of the power transmission coils, select the power transmission coils adjacent to each other from the transmission coils based on the detected relative position, thereby fixing a number of the selected power transmission coils, and cause the power transmission circuit to supply the AC power to the selected power transmission coils, in an array direction of the power transmission coils, a length Dwt of each of the power transmission coils is shorter than a maximum diameter Dwr of the power receiving coil.

[Item 10]

A power transmission device comprising:

power transmission coils arranged in a line such that each principal surface of the power transmission coils is in parallel to a surface of the power transmission device, the power transmission coils transmitting AC power wirelessly to a power receiving coil of a power receiving device;

a power transmission circuit that is connected to the power transmission coils and supplies the AC power to the power transmission coils; and control circuitry operative to:

switch an electrical connection state between the power transmission circuit and each of the power transmission coils, detect a relative position between the power receiving coil and each of the power transmission coils, select the power transmission coils adjacent to each other from the transmission coils based on the detected relative position, thereby fixing a number of the selected power transmission coils, and cause the power transmission circuit to supply the AC power to the selected power transmission coils, wherein in an array direction of the power transmission coils, a length Dwt of each of the power transmission coils is shorter than a maximum diameter Dwr of the power receiving coil and a ratio between the length Dwt and the maximum diameter Dwr satisfies $0.2 \leq Dwt/Dwr \leq 0.7$.

[Item 11]

A power transmission device that performs non-contact transmission of power to a power receiving device provided with a power receiving coil, the power transmission device including: a plurality of power transmission coils arranged in a line in a plane; a power transmission circuit that is connected to the plurality of power transmission coils and supplies AC power to the plurality of power transmission coils; and a control circuit that controls a connection state between the power transmission circuit and each power transmission coil, in which in an array direction of the plurality of power transmission coils, the length of each power transmission coil is shorter than the length of the power receiving coil, in a direction perpendicular to the array direction in the plane, the length of each power transmission coil is longer than the length of the power receiving coil, and the control circuit switches the connection state between the power transmission circuit and the plurality of power transmission coils such that the AC power is supplied to at least two adjacent power transmission coils selected from among the plurality of power transmission coils according the relative position of the power receiving coil with respect to the plurality of power transmission coils.

[Item 12]

The power transmission device according to Item 11, in which the control circuit connects a fixed number of power transmission coils selected from among the plurality of power transmission coils to the power transmission circuit when performing power transmission.

[Item 13]

The power transmission device according to Item 12, in which the control circuit connects two power transmission coils selected from among the plurality of power transmission coils to the power transmission circuit when performing power transmission.

[Item 14]

The power transmission device according to one of Items 11 to 13, in which the plurality of power transmission coils are connected to the power transmission circuit in such a way that the selected at least two power transmission coils generate magnetic fields of the same phase.

[Item 15]

The power transmission device according to one of Items 11 to 14, in which if the length of each power transmission coil in the array direction is Dwt and the maximum diameter of the power receiving coil is Dwr, $0.2 \leq Dwt/Dwr \leq 0.7$ is satisfied.

[Item 16]

The power transmission device according to one of Items 11 to 15, in which the length of each power transmission coil in the array direction is shorter than 24 mm, and the length of each power transmission coil in the plane in a direction perpendicular to the array direction is longer than 24 mm.

[Item 17]

The power transmission device according to one of Items 11 to 16, in which the plurality of power transmission coils are connected in parallel with respect to the power transmission circuit, the power transmission device further includes a plurality of switches which are placed between the power transmission circuit and the plurality of power transmission coils, and the control circuit switches the connection state between the power transmission circuit and the plurality of power transmission coils by switching a conduction state of the plurality of switches.

[Item 18]

The power transmission device according to Item 17, in which one end of each of the plurality of power transmission coils is connected to one end of another power transmission coil, another end of each of the plurality of power transmission coils is connected to one of the plurality of switches, and the power transmission device further includes a resonant capacitor which is connected between the one end of each of the plurality of power transmission coils and the power transmission circuit.

[Item 19]

A wireless power transmission system including: a power transmission device; and a power receiving device including a power receiving coil, in which the power transmission device includes a plurality of power transmission coils arranged in a line in a plane, a power transmission circuit that is connected to the plurality of power transmission coils and supplies AC power to the plurality of power transmission coils, and a control circuit that controls a connection state between the power transmission circuit and each power transmission coil, in an array direction of the plurality of power transmission coils, the length of each power transmission coil is shorter than the length of the power receiving coil, in a direction perpendicular to the array direction in the plane, the length of each power transmission coil is longer than the length of the power receiving coil, and the control circuit switches the connection state between the power transmission circuit and the plurality of power transmission coils such that the AC power is supplied to at least two adjacent power transmission coils selected from among the plurality of power transmission coils according the relative position of the power receiving coil with respect to the plurality of power transmission coils.

The power transmission device and the wireless power transmission system of the present disclosure can be widely used for applications that charge or supply power to electric vehicles, AV devices, batteries, medical equipment, and so forth, for example.

What is claimed is:

1. A power transmission device comprising:
power transmission coils arranged in a line such that each principal surface of the power transmission coils is in parallel to a surface of the power transmission device, the power transmission coils transmitting AC power wirelessly to a power receiving coil of a power receiving device;
a power transmission circuit that is connected to the power transmission coils and supplies the AC power to the power transmission coils; and
control circuitry operative to:
switch an electrical connection state between the power transmission circuit and each of the power transmission coils,
detect a relative position between the power receiving coil and each of the power transmission coils,
select two or more power transmission coils adjacent to each other from the power transmission coils based on the detected relative position, and
cause the power transmission circuit to supply the AC power to the selected two or more power transmission coils,
wherein, in an array direction of the power transmission coils, a width Dwt of each of the power transmission coils is shorter than a width Dwr of the power receiving coil, the array direction being an extending direction of the line in which the power transmission coils are arranged,
wherein, in a direction perpendicular to the array direction in a plane of the surface of the power transmission device, a width Dlt of each of the power transmission coils is equal to or longer than a width Dlr of the power receiving coil,
wherein, in the array direction of the power transmission coils, the width Dwt of each of the power transmission coils is shorter than the width Dwr of the power receiving coil and satisfies $0.2 \leq Dwt/Dwr$.

* * * * *